(12) United States Patent
Bernasconi

(10) Patent No.: US 8,260,142 B2
(45) Date of Patent: Sep. 4, 2012

(54) MULTI-CHANNEL OPTICAL ARRAYED TIME BUFFER

(75) Inventor: Pietro Bernasconi, Aberdeen, NJ (US)

(73) Assignee: Alcatel Lucent, Paris (FR)

( * ) Notice: Subject to any disclaimer, the term of this patent is extended or adjusted under 35 U.S.C. 154(b) by 36 days.

(21) Appl. No.: 12/459,246

(22) Filed: Jun. 29, 2009

(65) Prior Publication Data

US 2010/0329672 A1    Dec. 30, 2010

(51) Int. Cl.
*H04J 14/08* (2006.01)
(52) U.S. Cl. .......................... 398/102; 398/53; 398/161
(58) Field of Classification Search .................. 398/102, 398/161, 53
See application file for complete search history.

(56) References Cited

U.S. PATENT DOCUMENTS

| | | | |
|---|---|---|---|
| 5,416,769 A * | 5/1995 | Karol | 370/414 |
| 5,734,486 A * | 3/1998 | Guillemot et al. | 398/54 |
| 6,259,847 B1 | 7/2001 | Lenz et al. | |
| 6,289,151 B1 | 9/2001 | Kazarinov et al. | |
| 6,373,608 B1 | 4/2002 | Desurvire et al. | |
| 6,559,990 B1 * | 5/2003 | Matsuda | 398/102 |
| 6,609,840 B2 * | 8/2003 | Chow et al. | 398/102 |
| 6,731,829 B2 | 5/2004 | Ionov | |
| 6,801,721 B1 | 10/2004 | Madsen | |
| 6,956,991 B2 | 10/2005 | Madsen | |
| 7,016,615 B1 | 3/2006 | Lenz et al. | |
| 7,212,695 B2 | 5/2007 | Kasper et al. | |
| 7,369,719 B2 | 5/2008 | Bernasconi et al. | 385/14 |
| 7,627,253 B1 | 12/2009 | Ng | |
| 2001/0053007 A1 * | 12/2001 | Shikata | 359/140 |
| 2002/0015204 A1 * | 2/2002 | Frigo et al. | 359/130 |
| 2002/0085251 A1 * | 7/2002 | Ofek et al. | 359/117 |
| 2002/0097464 A1 | 7/2002 | Devaux et al. | |
| 2003/0170030 A1 * | 9/2003 | Usami et al. | 398/87 |
| 2006/0197936 A1 * | 9/2006 | Liebman et al. | 356/5.01 |
| 2009/0003830 A1 | 1/2009 | Fishman et al. | |

(Continued)

FOREIGN PATENT DOCUMENTS

CA    2434729 A1    2/2004

OTHER PUBLICATIONS

J. LeGrange, et al., "Demonstration of an Integrated, Tunable High Resolution True Time Delay Line," Lasers and Electro-Optics Society, 2004 (LEOS 2004), 17th annual meeting of IEEE, pp. 790-791.

(Continued)

*Primary Examiner* — M. R. Sedighian
(74) *Attorney, Agent, or Firm* — A. Yip

(57) ABSTRACT

In communications where synchronization of optical signals containing data is required, a multi-channel optical arrayed time buffer may be used. The time buffer includes multiple delay paths comprising delay elements, some of which can be shared to dispense different delays. In an embodiment, an arrayed waveguide grating (AWG) is illustratively used to route an optical signal to a first delay path, which is returnable to the AWG through the first delay path to be rerouted to a second delay path. The total delay affordable to the optical signal is a function of at least a first delay afforded by a delay element in the first delay path, and a second delay afforded by a delay element in the second delay path. In addition, without returning to the AWG, another optical signal may be routed through the second delay path alone to be afforded the second delay only.

21 Claims, 13 Drawing Sheets

U.S. PATENT DOCUMENTS

2009/0129779 A1  5/2009  Bernasconi et al. ............ 398/79
2009/0129780 A1  5/2009  Bernasconi et al. ............ 398/79

OTHER PUBLICATIONS

C.K. Madsen, et al., "Optical All-Pass Filters for Phase Response Design with Applications for Dispersion Compensation," IEEE Photonics Technology Letters, vol. 10, No. 7, Jul. 1998, pp. 994-996.

G. Lenz, et al., "Optical Delay Lines Based on Optical Filters," IEEE Journal of Quatum Electronics, vol. 37, No. 4, Apr. 2001, pp. 525-532.

J. Gripp, et al., "Optical Switch Fabrics for Ultra-High Capacity IP Routers," Journal of Lightwave Technology, 2003, vol. 21, No. 11, pp. 2839-2850.

J. LeGrange, et al., "Demonstration of an Integrated, Tunable High Resolution True Time Delay Line," Lasers and Electra-Optics Society, 2004 (LEOS 2004), 17th annual meeting of IEEE, pp. 790-791.

C. K. Madsen. et at., "Optical All-Pass Filters for Phase Response Design with Applications for Dispersion Compensation," IEEE Photonics Technology Letters, vol. 10, No. 7, Jul. 1998, pp. 994-996.

C.K. Madsen, et al., "Compact Integrated Tunable Chromatic Dispersion Compensator with a 4000 pshm Tuning Range," Optical Fiber Communication and Exhibit, 2001 (OFC 2001), (3 pages).

G. Lenz, et al., "Optical Delay Lines Based on Optical Filters," IEEE Journal of Quantum Electronics, vol. 37, No. 4, Apr. 2001, pp. 525-532.

Mahmoud S. Rasras, et al., "Integrated Resonance-Enhanced Variable Optical Delay Lines," IEEE Photonics Technology Letters, vol. 17, No. 4, Apr. 2005, pp. 834-836.

* cited by examiner

FIG. 4A

| INPUT PORT# OF AWG 310 | OUTPUT PORT# OF AWG 316 |
|---|---|
| 1 | 1 |
| 2 | 2 |
| 3 | 3 |
| 4 | 4 |
| 5 | 5 |
| 6 | 6 |
| 7 | 7 |
| 8 | 8 |

FIG. 4B

| INPUT PORT# OF AWG 312 | OUTPUT PORT# OF AWG 310 |
|---|---|
| 1 | 1 |
| 2 | 2 |
| 3 | 3 |
| 4 | 4 |
| 5 | 5 |
| 6 | 6 |
| 7 | 7 |
| 8 | 8 |

FIG. 4C

| INPUT PORT# OF AWG 314 | OUTPUT PORT# OF AWG 310 |
|---|---|
| 1 | 1 |
| 2 | 2 |
| 3 | 3 |
| 4 | 4 |
| 5 | 5 |
| 6 | 6 |
| 7 | 7 |
| 8 | 8 |

FIG. 4D

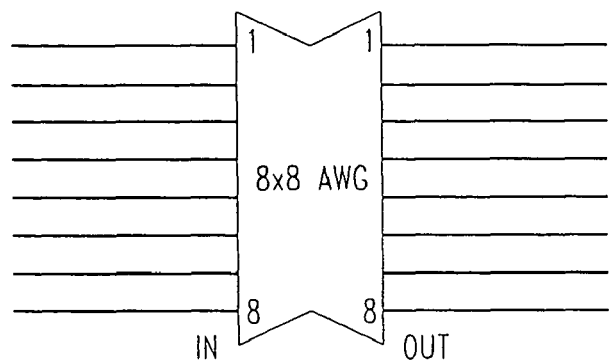

| INPUT PORT# \ OUTPUT PORT# | 1 | 2 | 3 | 4 | 5 | 6 | 7 | 8 | |
|---|---|---|---|---|---|---|---|---|---|
| 1 | $\lambda_1$ | $\lambda_2$ | $\lambda_3$ | $\lambda_4$ | $\lambda_5$ | $\lambda_6$ | $\lambda_7$ | $\lambda_8$ | }431 |
| 2 | $\lambda_8$ | $\lambda_1$ | $\lambda_2$ | $\lambda_3$ | $\lambda_4$ | $\lambda_5$ | $\lambda_6$ | $\lambda_7$ | |
| 3 | $\lambda_7$ | $\lambda_8$ | $\lambda_1$ | $\lambda_2$ | $\lambda_3$ | $\lambda_4$ | $\lambda_5$ | $\lambda_6$ | |
| 4 | $\lambda_6$ | | | | | | | $\lambda_5$ | |
| 5 | $\lambda_5$ | | | | | | | $\lambda_4$ | |
| 6 | $\lambda_4$ | | | | | | | $\lambda_3$ | |
| 7 | $\lambda_3$ | | | | | | | $\lambda_2$ | |
| 8 | $\lambda_2$ | $\lambda_3$ | $\lambda_4$ | $\lambda_5$ | $\lambda_6$ | $\lambda_7$ | $\lambda_8$ | $\lambda_1$ | |

FIG. 5

| DΔt | j | OPTICAL SIGNAL 2281 | OPTICAL SIGNAL 2282 | OPTICAL SIGNAL 2283 | OPTICAL SIGNAL 2284 | OPTICAL SIGNAL 2285 | OPTICAL SIGNAL 2286 | OPTICAL SIGNAL 2287 | OPTICAL SIGNAL 2288 | |
|---|---|---|---|---|---|---|---|---|---|---|
| Δt | 1 | $\lambda_1$ | $\lambda_2$ | $\lambda_3$ | $\lambda_4$ | $\lambda_5$ | $\lambda_6$ | $\lambda_7$ | $\lambda_8$ | } 521 |
| 2Δt | 2 | $\lambda_2$ | $\lambda_3$ | $\lambda_4$ | $\lambda_5$ | $\lambda_6$ | $\lambda_7$ | $\lambda_8$ | $\lambda_9$ | |
| 3Δt | 3 | $\lambda_3$ | $\lambda_4$ | $\lambda_5$ | $\lambda_6$ | $\lambda_7$ | $\lambda_8$ | $\lambda_9$ | $\lambda_{10}$ | |
| 4Δt | 4 | $\lambda_4$ | $\lambda_5$ | $\lambda_6$ | $\lambda_7$ | $\lambda_8$ | $\lambda_9$ | $\lambda_{10}$ | $\lambda_{11}$ | |
| 5Δt | 5 | $\lambda_5$ | $\lambda_6$ | $\lambda_7$ | $\lambda_8$ | $\lambda_9$ | $\lambda_{10}$ | $\lambda_{11}$ | $\lambda_{12}$ | |
| 6Δt | 6 | $\lambda_6$ | $\lambda_7$ | $\lambda_8$ | $\lambda_9$ | $\lambda_{10}$ | $\lambda_{11}$ | $\lambda_{12}$ | $\lambda_{13}$ | |
| 7Δt | 7 | $\lambda_7$ | $\lambda_8$ | $\lambda_9$ | $\lambda_{10}$ | $\lambda_{11}$ | $\lambda_{12}$ | $\lambda_{13}$ | $\lambda_{14}$ | |
| 8Δt | 8 | $\lambda_8$ | $\lambda_9$ | $\lambda_{10}$ | $\lambda_{11}$ | $\lambda_{12}$ | $\lambda_{13}$ | $\lambda_{14}$ | $\lambda_{15}$ | |
| 9Δt | 9 | $\lambda_9$ | $\lambda_{10}$ | $\lambda_{11}$ | $\lambda_{12}$ | $\lambda_{13}$ | $\lambda_{14}$ | $\lambda_{15}$ | $\lambda_{16}$ | } 523 |
| 10Δt | 10 | $\lambda_{10}$ | $\lambda_{11}$ | $\lambda_{12}$ | $\lambda_{13}$ | $\lambda_{14}$ | $\lambda_{15}$ | $\lambda_{16}$ | $\lambda_{17}$ | |
| 11Δt | 11 | $\lambda_{11}$ | $\lambda_{12}$ | $\lambda_{13}$ | $\lambda_{14}$ | $\lambda_{15}$ | | $\lambda_{17}$ | $\lambda_{18}$ | |
| 12Δt | 12 | $\lambda_{12}$ | $\lambda_{13}$ | $\lambda_{14}$ | $\lambda_{15}$ | | | $\lambda_{18}$ | $\lambda_{19}$ | |
| 13Δt | 13 | $\lambda_{13}$ | $\lambda_{14}$ | $\lambda_{15}$ | | | | $\lambda_{19}$ | $\lambda_{20}$ | |
| 14Δt | 14 | $\lambda_{14}$ | $\lambda_{15}$ | | | | | $\lambda_{20}$ | $\lambda_{21}$ | |
| 15Δt | 15 | $\lambda_{15}$ | $\lambda_{16}$ | | | | | $\lambda_{21}$ | $\lambda_{22}$ | |
| 16Δt | 16 | $\lambda_{16}$ | $\lambda_{17}$ | | | ⋮ | | $\lambda_{22}$ | $\lambda_{23}$ | |
| 17Δt | 17 | $\lambda_{17}$ | $\lambda_{18}$ | | | ⋮ | | $\lambda_{23}$ | $\lambda_{24}$ | } 527 |
| 18Δt | 18 | $\lambda_{18}$ | $\lambda_{19}$ | | | ⋮ | | $\lambda_{24}$ | $\lambda_1$ | |
| 19Δt | 19 | $\lambda_{19}$ | $\lambda_{20}$ | | | | | $\lambda_1$ | $\lambda_2$ | |
| 20Δt | 20 | $\lambda_{20}$ | $\lambda_{21}$ | | | | $\lambda_1$ | $\lambda_2$ | $\lambda_3$ | |
| 21Δt | 21 | $\lambda_{21}$ | $\lambda_{22}$ | | | $\lambda_1$ | $\lambda_2$ | $\lambda_3$ | $\lambda_4$ | |
| 22Δt | 22 | $\lambda_{22}$ | $\lambda_{23}$ | | $\lambda_1$ | $\lambda_2$ | $\lambda_3$ | $\lambda_4$ | $\lambda_5$ | |
| 23Δt | 23 | $\lambda_{23}$ | $\lambda_{24}$ | $\lambda_1$ | $\lambda_2$ | $\lambda_3$ | $\lambda_4$ | $\lambda_5$ | $\lambda_6$ | |
| 24Δt | 24 | $\lambda_{24}$ | $\lambda_1$ | $\lambda_2$ | $\lambda_3$ | $\lambda_4$ | $\lambda_5$ | $\lambda_6$ | $\lambda_7$ | } 525 |

500

501 503 505 507 509 511 513 515

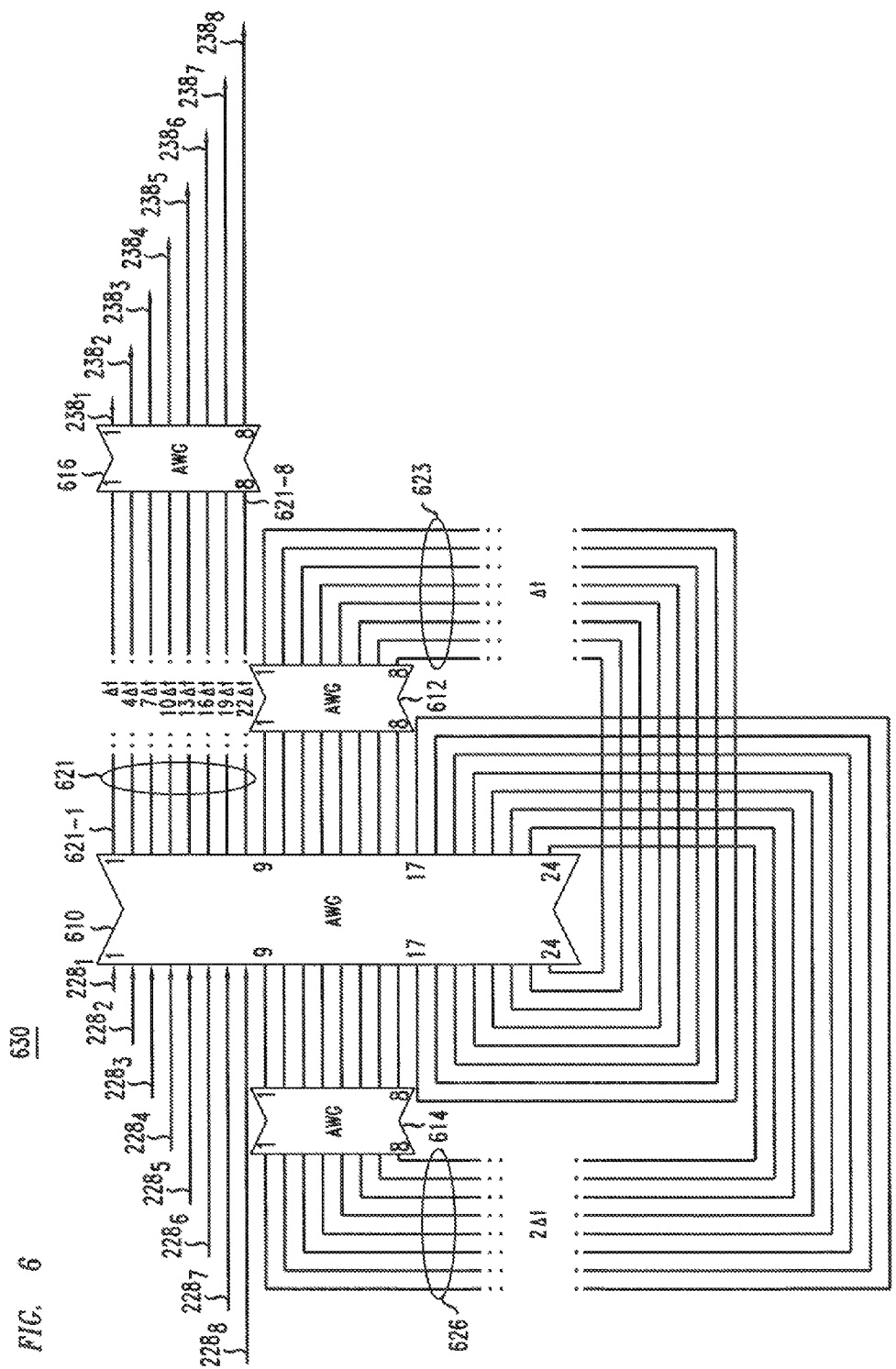

*FIG. 7A*

| INPUT PORT# OF AWG 610 | OUTPUT PORT# OF AWG 616 |
|---|---|
| 1 | 1 |
| 2 | 2 |
| 3 | 3 |
| 4 | 4 |
| 5 | 5 |
| 6 | 6 |
| 7 | 7 |
| 8 | 8 |

*FIG. 7B*

| INPUT PORT# OF AWG 612 | OUTPUT PORT# OF AWG 610 |
|---|---|
| 1 | 1 |
| 2 | 2 |
| 3 | 3 |
| 4 | 4 |
| 5 | 5 |
| 6 | 6 |
| 7 | 7 |
| 8 | 8 |

*FIG. 7C*

| INPUT PORT# OF AWG 614 | OUTPUT PORT# OF AWG 610 |
|---|---|
| 1 | 1 |
| 2 | 2 |
| 3 | 3 |
| 4 | 4 |
| 5 | 5 |
| 6 | 6 |
| 7 | 7 |
| 8 | 8 |

FIG. 8

| DΔt | j | OPTICAL SIGNAL 2281 | OPTICAL SIGNAL 2282 | OPTICAL SIGNAL 2283 | OPTICAL SIGNAL 2284 | OPTICAL SIGNAL 2285 | OPTICAL SIGNAL 2286 | OPTICAL SIGNAL 2287 | OPTICAL SIGNAL 2288 | |
|---|---|---|---|---|---|---|---|---|---|---|
| Δt | 1 | $\lambda_1$ | $\lambda_{24}$ | $\lambda_{23}$ | $\lambda_{22}$ | $\lambda_{21}$ | $\lambda_{20}$ | $\lambda_{19}$ | $\lambda_{18}$ | } 821 |
| 2Δt | 9 | $\lambda_9$ | $\lambda_8$ | $\lambda_7$ | $\lambda_6$ | $\lambda_5$ | $\lambda_4$ | $\lambda_3$ | $\lambda_2$ | } 827 |
| 3Δt | 17 | $\lambda_{17}$ | $\lambda_{16}$ | $\lambda_{15}$ | $\lambda_{14}$ | $\lambda_{13}$ | $\lambda_{12}$ | $\lambda_{11}$ | $\lambda_{10}$ | } 829 |
| 4Δt | 2 | $\lambda_2$ | $\lambda_1$ | $\lambda_{24}$ | $\lambda_{23}$ | $\lambda_{22}$ | $\lambda_{21}$ | $\lambda_{20}$ | $\lambda_{19}$ | |
| 5Δt | 10 | $\lambda_{10}$ | $\lambda_9$ | $\lambda_8$ | $\lambda_7$ | $\lambda_6$ | $\lambda_5$ | $\lambda_4$ | $\lambda_3$ | } 823 |
| 6Δt | 18 | $\lambda_{18}$ | $\lambda_{17}$ | $\lambda_{16}$ | $\lambda_{15}$ | $\lambda_{14}$ | $\lambda_{13}$ | $\lambda_{12}$ | $\lambda_{11}$ | |
| 7Δt | 3 | $\lambda_3$ | $\lambda_2$ | $\lambda_1$ | $\lambda_{24}$ | $\lambda_{23}$ | $\lambda_{22}$ | $\lambda_{21}$ | $\lambda_{20}$ | |
| 8Δt | 11 | $\lambda_{11}$ | $\lambda_{10}$ | $\lambda_9$ | $\lambda_8$ | $\lambda_7$ | $\lambda_6$ | $\lambda_5$ | $\lambda_4$ | |
| 9Δt | 19 | $\lambda_{19}$ | $\lambda_{18}$ | $\lambda_{17}$ | $\lambda_{16}$ | $\lambda_{15}$ | $\lambda_{14}$ | $\lambda_{13}$ | $\lambda_{12}$ | |
| 10Δt | 4 | $\lambda_4$ | $\lambda_3$ | $\lambda_2$ | $\lambda_1$ | $\lambda_{24}$ | $\lambda_{23}$ | $\lambda_{22}$ | $\lambda_{21}$ | |
| 11Δt | 12 | $\lambda_{12}$ | $\lambda_{11}$ | $\lambda_{10}$ | $\lambda_9$ | $\lambda_8$ | | $\lambda_6$ | $\lambda_5$ | |
| 12Δt | 20 | $\lambda_{20}$ | $\lambda_{19}$ | $\lambda_{18}$ | $\lambda_{17}$ | | | $\lambda_{14}$ | $\lambda_{13}$ | |
| 13Δt | 5 | $\lambda_5$ | $\lambda_4$ | $\lambda_3$ | | | | $\lambda_{24}$ | $\lambda_{23}$ | |
| 14Δt | 13 | $\lambda_{13}$ | $\lambda_{12}$ | | | | | $\lambda_7$ | $\lambda_6$ | |
| 15Δt | 21 | $\lambda_{21}$ | $\lambda_{20}$ | | | | : | $\lambda_{15}$ | $\lambda_{14}$ | |
| 16Δt | 6 | $\lambda_6$ | $\lambda_5$ | | | | : | $\lambda_{24}$ | $\lambda_{23}$ | |
| 17Δt | 14 | $\lambda_{14}$ | $\lambda_{13}$ | | | | : | $\lambda_8$ | $\lambda_7$ | |
| 18Δt | 22 | $\lambda_{22}$ | $\lambda_{21}$ | | | | : | $\lambda_{16}$ | $\lambda_{15}$ | |
| 19Δt | 7 | $\lambda_7$ | $\lambda_6$ | | | | | $\lambda_1$ | $\lambda_{24}$ | |
| 20Δt | 15 | $\lambda_{15}$ | $\lambda_{14}$ | | | | $\lambda_{10}$ | $\lambda_9$ | $\lambda_8$ | |
| 21Δt | 23 | $\lambda_{23}$ | $\lambda_{22}$ | | | $\lambda_{19}$ | $\lambda_{18}$ | $\lambda_{17}$ | $\lambda_{16}$ | |
| 22Δt | 8 | $\lambda_8$ | $\lambda_7$ | | $\lambda_5$ | $\lambda_4$ | $\lambda_3$ | $\lambda_2$ | $\lambda_1$ | |
| 23Δt | 16 | $\lambda_{16}$ | $\lambda_{15}$ | $\lambda_{14}$ | $\lambda_{13}$ | $\lambda_{12}$ | $\lambda_{11}$ | $\lambda_{10}$ | $\lambda_9$ | |
| 24Δt | 24 | $\lambda_{24}$ | $\lambda_{23}$ | $\lambda_{22}$ | $\lambda_{21}$ | $\lambda_{20}$ | $\lambda_{19}$ | $\lambda_{18}$ | $\lambda_{17}$ | } 825 |

800

801

MULTI-CHANNEL OPTICAL ARRAYED TIME BUFFER

The present invention was made with the U.S. Government support under Contract No. FA 8750-04-C-0013 awarded by the Microsystems Technology Office (MTO) of Defense Advanced Research Projects Agency (DARPA). The U.S. Government has certain rights in the invention.

CROSS-REFERENCE TO RELATED APPLICATIONS

This application is related to commonly assigned, copending U.S. patent application Ser. No. 11/941,191 ("the '191 application"), filed on Nov. 16, 2007, and published on May 21, 2009 as Pub. No. 2009/0129779; and also related to commonly assigned, copending U.S. patent application Ser. No. 11/941,201 ("the '201 application"), filed on Nov. 16, 2007, and published on May 21, 2009 as Pub. No. 2009/0129780, both of which are incorporated herein by reference in their entirety.

FIELD OF THE INVENTION

The invention relates to a technique for optical communications and, more particularly, to a technique for time-buffering optical signals.

BACKGROUND OF THE INVENTION

This section introduces aspects that may help facilitate a better understanding of the invention. Accordingly, the statements of this section are to be read in this light and are not to be understood as admissions about what is prior art or what is not prior art.

An optical packet router is an important component of an optical communication network. An efficient optical packet router is based on a synchronous optical switch fabric, which enables substantial enhancement of bandwidth and reduction in network latency. Proper operation of a synchronous optical switch fabric is achieved when all incoming data packets are appropriately synchronized to a reference clock. However, if the synchronization is not sufficiently accurate and/or stable, the resulting skew and/or jitter in incoming data packets may cause transmission errors or other deleterious effects on the network traffic. For example, one deleterious effect of poor alignment is that it might force the use of a relatively large guard time between packets, bits, cells, and/or envelopes, which appreciably reduces the throughput of the switch or router.

The aforementioned '191 and '201 applications disclose channel synchronizers for synchronizing data packets from different channels heading to an optical router. Different channel synchronizers are described in such applications, some of which incorporate a multi-channel optical arrayed time buffer, having an array of delay lines (e.g., optical fibers) of different lengths coupled between two arrayed waveguide gratings (AWGs).

BRIEF SUMMARY

While the aforementioned multi-channel optical arrayed time buffer may be desirable in that it can be implemented as an integrated waveguide circuit, an aspect of this time buffer has been recognized to be disadvantageous in certain applications. In particular, in an application where longer delays are required of the time buffer, the optical lengths of the individual delay lines in the time buffer may need to increase dramatically to accommodate such delays. Accordingly, the time buffer may become so bulky that it can no longer be efficiently integrated into a compact circuit.

The invention overcomes the above-identified size limitation by sharing some of the delay lines in a time buffer to dispense different delays. In accordance with an embodiment of the invention, a time buffer includes multiple delay paths which comprise delay elements for imparting delays to optical signals traversing therethrough, respectively. A passive optical device (e.g., an AWG) is used in the time buffer for routing an optical signal input thereto to a first delay path. The optical signal is returnable to the passive optical device through the first delay path to be rerouted by the passive optical device to a second delay path. As a result, the total delay affordable to the optical signal is a function of at least a first delay afforded by a delay element in the first delay path, and a second delay afforded by a delay element in the second delay path. In addition, without returning to the AWG, another optical signal may be routed through the second delay path alone to be afforded the second delay only.

BRIEF DESCRIPTION OF THE DRAWINGS

FIGS. 4A-C are tables showing input/output relations between respective pairs of arrayed waveguide gratings (AWGs) used in the time buffer of FIG. 3;

FIG. 4D illustrates a generic AWG which can be used in the time buffer of FIG. 3;

FIG. 4E is a table depicting input/output port mapping of the AWG of FIG. 4D;

FIG. 5 is a table for use with the time buffer of FIG. 3, which shows, among other things, the wavelength requirements of input optical signals to the time buffer for them to attain various delays;

FIG. 6 is a block diagram of a multi-channel optical arrayed time buffer which may be used in the channel synchronizer of FIG. 2 according to another illustrative embodiment of the invention;

FIGS. 7A-C are tables showing input/output relations between respective pairs of arrayed waveguide gratings (AWGs) used in the time buffer of FIG. 6;

FIG. 8 is a table for use with the time buffer of FIG. 6, which shows, among other things, the wavelength requirements of input optical signals to the time buffer for them to attain various delays;

DETAILED DESCRIPTION

Figure 1:
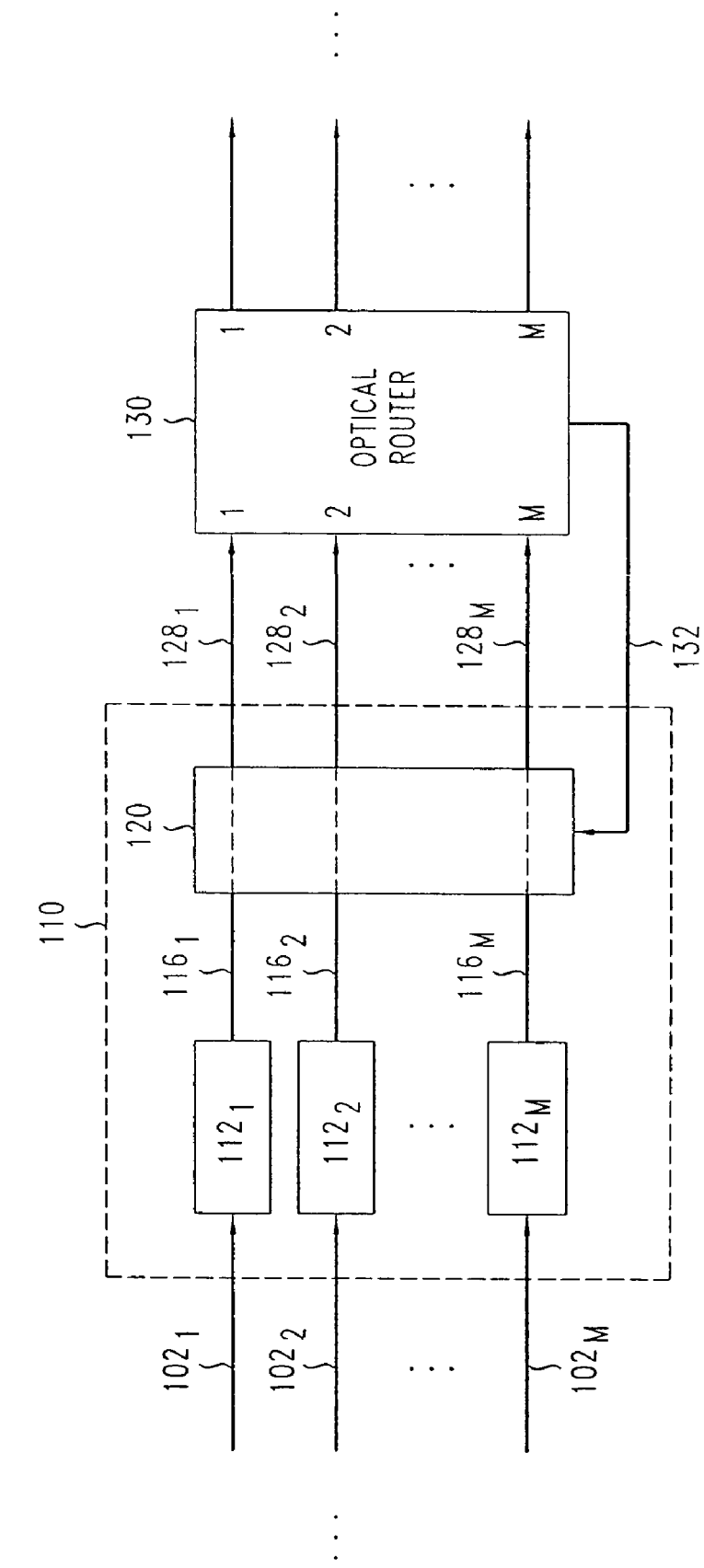
FIG. 1 shows a portion of an optical communication system according to an illustrative embodiment of the invention.

FIG. 1 shows a portion of an optical communication system 100 according to an embodiment of the invention. System 100 receives a plurality of wavelength division multiplexing (WDM) signals $102_1$-$102_M$ from external network components (not shown). Each of signals $102_1$-$102_M$ has N carrier wavelengths ($\lambda_1$-$\lambda_N$), each modulated to carry data packets.

An optical communication system similar to system 100 is usually designed so that each of its optical elements has appropriate spectral characteristics that enable proper handling of the WDM signals that populate the system. The number of and spectral separation between the WDM components of a WDM signal are usually set based on a convention or standard. For example, the most common frequency (wavelength) grid is that used for dense WDM (WDM) and defined by a standard promulgated by the International Telecommunication Union (see ITU-T G.694.1). This grid is defined relative to 193.1 THz and extends from about 191.7 THz to about 196.1 THz, with 100-GHz spacing. While defined in frequency, the grid is also often expressed in terms of wavelength, in which case its wavelength range is from about 1528 nm to about 1564 nm, with about 0.8-nm channel spacing. For practical purposes the grid is often extended to cover the range from about 186 THz to about 201 THz and subdivided to provide 50-GHz and 25-GHz spaced grids.

At a transmitter (not shown) of system 100, different WDM components are generated, e.g., using lasers and optical modulators, and applied to a multiplexer, where they are multiplexed to form a corresponding WDM signal. En route to a receiver (not completely shown in FIG. 1) of system 100, the WDM signal may pass through one or more optical add-drop multiplexers, optical filters, and optical routers (e.g., similar to router 130), wherein the original WDM signal might be altered in terms of its wavelength composition and/or data content. At the receiver, the WDM signal is applied to a de-multiplexer, which splits it into individual WDM components for detection. The hardware of the optical signal generators, multiplexers, filters, routers, and de-multiplexers employed in the system ultimately defines the spectral characteristics of the WDM signals transported therein.

For a given WDM signal 102, data packets corresponding to different wavelengths may or may not be synchronized with one another. As used herein, the term "synchronized" refers to temporal alignment of data packets at respective selected locations. For example, two data packets of different wavelengths in a single WDM signal 102 are considered to be synchronized at an input port of system 100 if their leading edges arrive at that input port substantially simultaneously, i.e., the difference between the times of arrival is smaller than a designated relatively small tolerance. Two data packets of the same wavelength or different wavelengths in two different WDM signals 102 are considered to be synchronized at two different respective input ports of system 100 if their leading edges arrive at those respective input ports substantially simultaneously. Furthermore, two data packets of the same or different wavelengths in the same or different WDM signals 102 are considered to be synchronized if their leading edges arrive at respective same or different locations with a predetermined relative time delay, i.e., the difference between the times of arrival deviates from the predetermined time delay by no more than a designated tolerance.

System 100 has a synchronous optical router 130 having M input ports and M output ports and capable of directing a data packet received at any of its input ports to any of its output ports. For example, data packets of wavelengths $\lambda_a$ and $\lambda_b$ ($1 \leq a, b \leq N$) applied at times to an input port can be routed to any selected output ports p and q ($1 \leq p, q \leq M$), respectively. Router 130 incorporates an appropriate controller that prevents packet collisions at the output ports. More specifically, the controller configures router 130 so that, in any given time slot, an output port does not receive from the input ports more than one packet of each wavelength. More details on synchronous optical routers similar to router 130 can be found, e.g., in an article by J. Gripp, et al., entitled "Optical Switch Fabrics for Ultra-High Capacity IP Routers," published in Journal of Lightwave Technology, 2003, v. 21, no. 11, pp. 2839-2850, which is incorporated herein by reference in its entirety.

Router 130 operates properly if WDM signals $128_1$-$128_M$ applied to input ports 1-M, respectively, are appropriately synchronized to one another and to a reference clock that controls the synchronous switching function of the router. To have signals $128_1$-$128_M$ synchronized, system 100 incorporates an optical signal synchronizer 110. Synchronizer 110 receives WDM signals $102_1$-$102_M$, which may or may not be synchronized, and processes them to produce synchronized WDM signals $128_1$-$128_M$, respectively. The following synchronizations might be lacking in WDM signals $102_1$-$102_M$: (1) between two or more different WDM components of a single WDM signal 102 and (2) between two or more different WDM signals 102. In contrast, WDM signals $128_1$-$128_M$ are appropriately synchronized to one another and to a reference clock signal 132 supplied by router 130. More specifically, different WDM signals 128 are synchronized to one another and to reference clock signal 132. In addition, different WDM components of each WDM signal 128 are synchronized to one another and to reference clock signal 132. As used herein, the term "WDM component" means a component of the WDM signal that can carry data, e.g., a data packet. Spectrally, a WDM component comprises a carrier wavelength and one or more modulation sidebands corresponding to that carrier wavelength. Different WDM components of the same WDM signal have different carrier wavelengths and generally carry independent sets of data.

Synchronizer 110 has a plurality of channel synchronizers $112_1$-$112_M$. Each channel synchronizer 112 is dedicated to processing a respective WDM signal 102 and operates to synchronize packets of different wavelengths (channels) in that signal to each other. A WDM signal $116_m$ produced by channel synchronizer $112_m$ carries the same data packets as WDM signal $102_m$ ($1 \leq m \leq M$). However, those data packets are synchronized to one another even if such synchronization was not present in the original WDM signal.

WDM signals $116_1$-$116_M$ produced by channel synchronizers $112_1$-$112_M$, respectively, are applied to a multiplex synchronizer 120, which operates to synchronize different WDM signals to one another and to reference clock signal 132. The resulting synchronized WDM signals $128_1$-$128_M$ are suitable for synchronous switching in router 130. Synchronizer 120 is termed a "multiplex synchronizer" because it synchronizes a plurality of multiplexes, i.e., WDM signals $116_1$-$116_M$. In one embodiment, multiplex synchronizer 120 is a waveguide circuit designed to synchronize WDM signals $116_1$-$116_M$ without demultiplexing any of them into individual WDM components.

Figure 2:
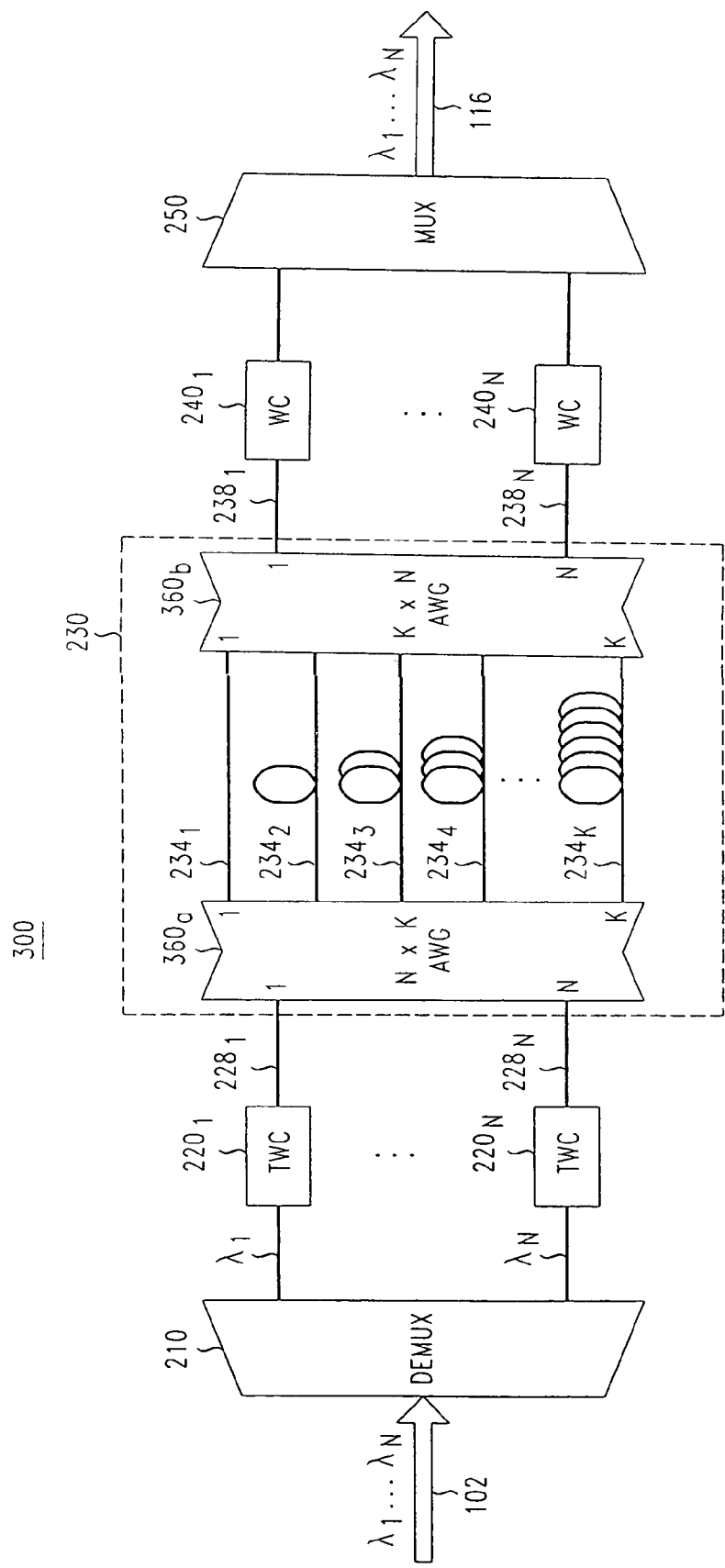
FIG. 2 is a block diagram of a channel synchronizer which may be used in the system of FIG. 1.

FIG. 2 shows a block diagram of an all-optical channel synchronizer 300 that can be used as each instance of channel synchronizer 112 of FIG. 1 according to one embodiment of the invention. Channel synchronizer 300 has a demultiplexer (DEMUX) 210 that separates WDM signal 102 into its N individual WDM components and applies each WDM component to a respective tunable wavelength converter (TWC) 220. Each TWC 220 is designed to convert its input wavelength into a selected one of K output wavelengths, which K output wavelengths may or may not include some or all of wavelengths $\lambda_1$-$\lambda_N$. The output of each TWC 220 feeds a respective channel of multi-channel optical arrayed time buffer 230. In this instance, time buffer 230 includes an array of delay lines $234_1$-$234_K$ (e.g., optical fibers) coupled between arrayed waveguide gratings (AWGs) 360a and 360b. Each of AWGs 360a and 360b has (i) a first side having N ports and (ii) a second side having K ports. Each AWG 360 is designed to operate using the K possible output wavelengths of TWCs 220. Delay lines $234_1$-$234_K$ have different optical lengths, e.g., incrementally increasing from a relatively short length of delay line $234_1$ to a relatively long length of delay line $234_K$. In one embodiment, signal-propagation times for any two adjacent delay lines 234 differ by the same time increment Δt, which time increment determines the time resolution of time buffer 230.

Time buffer 230 relies upon delay lines $234_1$-$234_K$ which, as fully described below, are individually addressable via wavelength switching in AWG 360a, to impart different delays to a signal 228 traversing time buffer 230. The wavelength conversion imposed by TWC 220 determines to which one of delay lines $234_1$-$234_K$ a signal 228 is switched by AWG 360a. By appropriately selecting the output wavelengths for different TWCs 220, one can therefore delay signals $228_1$-$228_N$ by respective appropriate delay times to produce at the output ports of AWG 360b synchronized optical signals $238_1$-$238_N$. Note that signals $238_1$-$238_N$ are synchronized to within about one half of or less the time resolution (Δt) of time buffer 230. In one embodiment, delay unit 230 has a Δt value of about 1/10 of the optical-packet length. If the temporal alignment of one or more components of WDM signal 102 changes over time, the wavelength conversion selection for TWCs $220_1$-$220_N$ can be adjusted accordingly to maintain synchronization of signals $238_1$-$238_N$.

In this instance, each AWG 360 in time buffer 230 is a cyclical AWG. More specifically, each of the N ports located at the first side of AWG 360 is optically coupled to each of the K ports located at the second side of the AWG using K wavelengths. Mathematically, optical coupling of any port located at the first side of AWG 360 to the K optical ports located at the second side of that AWG can be described by a K-dimensional vector (hereinafter the "coupling vector") having, as its components, the K wavelengths arranged in an appropriate order. For an N×K cyclical AWG, if one of such coupling vectors is known, then the remaining N−1 coupling vectors can be obtained by cyclically shifting the wavelength components of the known coupling vector.

AWGs 360 in time buffer 230 are arranged symmetrically, and provisioned in such a well known manner that an optical signal 228, regardless of its wavelength, entering input port i (1≦i≦N) of AWG 360a emerges from a respective output port o (1≦o≦N) of AWG 360b as the corresponding signal 238, thereby achieving a fixed connectivity between an input port i of AWG 360a and an output port o of AWG 360b. For the sake of convenience, in this instance, AWGs 360 are provisioned in such a way that optical signal $228_i$, regardless its wavelength, entering input port i of AWG 360a emerges from output port i (i.e., o=i) of AWG 360b as signal $328_i$.

By exploiting the above-described cyclical property of AWG 360a, the N coupling vectors associated with the respective input ports of AWG 360a can be easily defined. Where K≧N which is the case here, these coupling vectors vary from one another and each have a different $k^{th}$ wavelength component (1≦k≦K). That is, any input optical signals 280 having the same wavelength but applied to different input ports of AWG 360a are always routed to its different output ports, and thus different delay lines connected thereto, in accordance with the different coupling vectors associated with the input ports. Alternately stated, if any one of delay lines $234_1$-$234_K$ receives two or more optical signals at the same time, those optical signals would have different respective wavelengths and would not collide with one another. Advantageously, with no signal collisions, only one array of delay lines $234_1$-$234_K$, as opposed to multiple arrays, for all input optical signals 280 is needed in channel synchronizer 300.

As previously mentioned, the wavelength conversion imposed by each particular TWC 220 in channel synchronizer 300 determines through which one of delay lines $234_1$-$234_K$ the corresponding optical signal 228 propagates before it emerges as optical signal 238 at the back side of AWG 360b. By appropriately selecting the output wavelengths for different TWCs 220 in channel synchronizer 300, one can therefore synchronize optical signals $238_1$-$238_N$ to one another.

Figure 3:
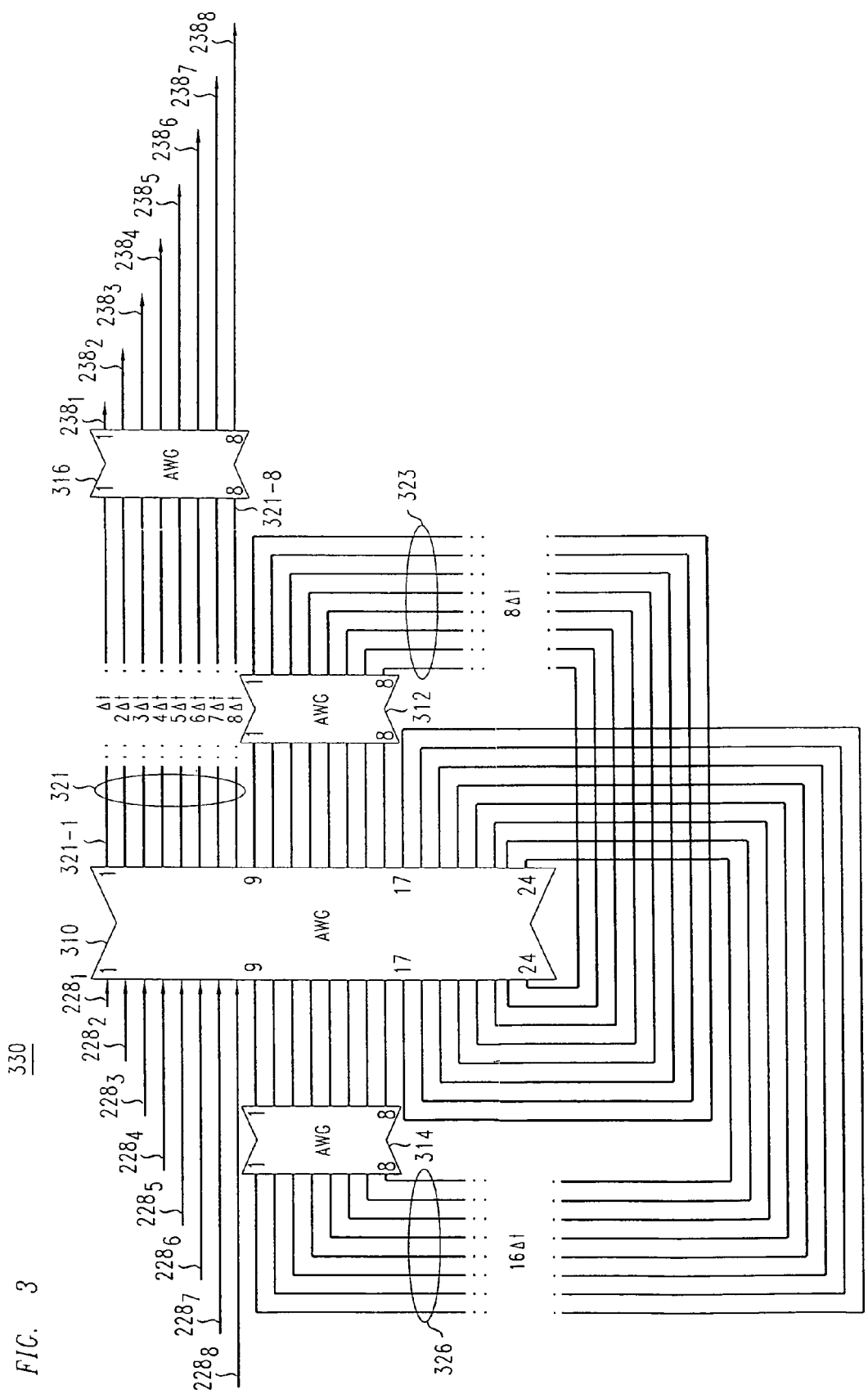
FIG. 3 is a block diagram of a multi-channel optical arrayed time buffer which may be used in the channel synchronizer of FIG. 2 according to an illustrative embodiment of the invention.

A limitation of the design of time buffer 230 stems from the fact that where longer delays are required of the time buffer, the optical lengths of the individual delay lines in the array may need to increase dramatically to accommodate such delays. Accordingly, time buffer 230 may become so bulky that it can no longer be efficiently integrated into a compact circuit. To overcome this limitation, in accordance with an embodiment of the invention, time buffer 230 may be replaced by multi-channel optical arrayed time buffer 330, as illustrated in FIG. 3. Without loss of generality, time buffer 330 has N=8 input optical ports at which the respective optical signals $228_1$-$228_8$ enter, each of which is afforded one of K=24 different delays. Unlike an equivalent time buffer 230 with N=8 and K=24, time buffer 330 may re-circulate an input optical signal in a manner to be described to extend a delay thereto through a shared delay line, thereby reducing the lengths of some of the delay lines, and thus the size, of the equivalent time buffer 230. To that end, time buffer 330 in this instance employs a 24×24 AWG, denoted 310, and three 8×8 AWGs, denoted 312, 314 and 316, respectively. Optical signals $228_1$-$228_8$ enter time buffer 330 at respective input ports 1-8 of AWG 310 and emerge from time buffer 330 at respective output ports 1-8 of AWG 316 as $238_1$-$238_8$. For ease of following, some of the port numbers are indicated in FIG. 3. Like time buffer 230, time buffer 330 is provisioned to maintain a fixed connectivity between its input ports (same as input ports 1-8 of AWG 310) and its output ports (same as output ports 1-8 of AWG 316). For the sake of convenience and without loss of generality, in this embodiment such a fixed input/output (I/O) port connectivity is implemented as depicted in FIG. 4A, whereby optical signal $228_i$ (1≦i≦8) entering input port i of AWG 310 always emerges from output port i of AWG 316 as signal $238_i$, regardless of the actual wavelength of signal $228_i$.

Similarly, in this embodiment a fixed (I/O) port connectivity between the AWG 312 and 310 pair is maintained as depicted in FIG. 4B, whereby an optical entering input port i (1≦i≦8) of AWG 312 always emerges from output port i of AWG 310, regardless of the actual wavelength of the entering optical signal. In addition, in this embodiment a fixed (I/O) port connectivity between the AWG 314 and 310 pair is maintained as depicted in FIG. 4C, whereby an optical signal entering input port i (1≦i≦8) of AWG 314 always emerges from output port i of AWG 310, regardless of the actual wavelength of the entering optical signal. Again, it should be noted that the above I/O port connectivity between the various AWG pairs are for illustrative purposes only. It will be appreciated that a person skilled in the art may implement other I/O port permutations to suit his/her particular needs.

Referring back to FIG. 3, in this embodiment AWG 310 has 24 input ports, which is a multiple of the number of input signals to time buffer 330, i.e., three times the number of input signals (8). The 24 output ports of AWG 310 are divided into groups of eight. The first group consists of output ports 1-8, which are connected to input ports 1-8 of AWG 316 through an array of eight delay lines (denoted 321), affording $\Delta t$, $2\Delta t$ . . . and $8\Delta t$ delays, respectively, which arrangement is analogous to that of time buffer 230 of FIG. 2. The second group of output ports 9-16 of AWG 310 are connected to input ports 1-8 of AWG 312, and reconnected to AWG 310 through a second array of eight delay lines, denoted 323, which uniformly afford an $8\Delta t$ delay. The third group of output ports 17-24 of AWG 310 are connected to input ports 1-8 of AWG 314 through a third array of eight delay lines, denoted 326, which uniformly afford a $16\Delta t$ delay. The output ports of AWG 314 are connected to respective input ports of AWG 310.

In accordance with an embodiment of the invention, each AWG in time buffer 330 in this instance is a cyclical AWG, and has a free spectral range equal to the number of input ports times the channel spacing ($\Delta\lambda$) of input wavelengths $\lambda_k$ (k=1 . . . 24), where $\lambda_k=\lambda_1+k\Delta\lambda$, and $\lambda_1$ is a predetermined wavelength. Depending on the actual wavelength $\lambda_k$ of signal $228_i$, it may circulate through AWG 312 to gain an extended delay of $8\Delta t$, or through AWG 314 to gain an extended delay of $16\Delta t$, before reentering AWG 310 to be routed to one of delay lines in array 321. In fact, by adjusting TWC $220_i$ to provide a selected one of $\lambda_k$ for signal $228_i$, the above-described arrangement of time buffer 330 can impart any of $\Delta t$, $2\Delta t$ . . . up to $24\Delta t$ to signal $228_i$. FIG. 5 is a table 500 defining the relation between input signal $228_i$ of varying wavelengths $\lambda_k$ and the 24 different time delays which can be imparted to the signal by routing it to the corresponding output port j (=1 . . . 24) of AWG 310 in time buffer 330. In general, for input optical signal $228_i$ of wavelength $\lambda_k$, time buffer 330 imparts a delay $D\Delta t$ to the input signal, where D=8(p DIV 8)+(k+i−1) MOD 8, p=(k+i−1) MOD 24, and DIV represents the standard integer division operator, and MOD represents the standard modulo operator.

In table 500, columns 501, 503, 505, 507, 509, 511, 513 and 515 represent the coupling vectors associated with input ports 1-8 (CV1-CV8) of AWG 310, respectively, each having 24 wavelength components. For example, by referring to column 501, the coupling vector associated with input port 1 (CV1) of AWG 310 is ($\lambda_1 \lambda_2 \ldots \lambda_{24}$). Because of the cyclical nature of all AWGs including AWG 310 in time buffer 330 in this instance, other coupling vectors, CV2 through CV8, can easily be obtained by cyclically shifting the components of CV1 one position at a time.

It should be noted at this point that because in this embodiment, each of 8×8 AWGs 312, 314 and 316 is also a cyclical AWG, it exhibits the cyclic properties similar to those of AWG 310. FIG. 4D shows an 8×8 AWG 412, without loss of generality, representing any one of AWGs 312, 314 and 316 here. The input/output port mapping of AWG 412 with respect to different wavelength inputs is shown using table 425 in FIG. 4E. For example, referring to row 431, inputs signals having wavelengths $\lambda_1 \lambda_2 \ldots \lambda_8$ entering input port 1 are routed by AWG 412 to its output ports 1-8, respectively. Thus, the coupling vector associated with input port 1 (CV1) of AWG 412 is ($\lambda_1 \lambda_2 \ldots \lambda_8$). Similarly, CV2 through CV8 of AWG 412 are defined by the other rows of table 425. In fact, because of the cyclical nature of AWG 412, CV2 through CV8, can easily be derived from CV1 by cyclically shifting the components of CV1 one position at a time. It should also be noted that each column of table 425 has different wavelength entries, signifying the fact that no wavelength (signal) collision is possible at each output port of AWG 412.

Referring back to FIG. 5, each row of table 500 is associated with a particular one of the 24 delays, which specifies the required wavelengths of individual signals $228_i$ to be afforded the particular delay, and the output port j of AWG 310 from which a delay path emanates through which the required wavelengths travel in time buffer 330. For example, referring to row 521 and FIG. 3, any of optical signal $228_1$ entering input port 1 of AWG 310 having a wavelength of $\lambda_1$, optical signal $228_2$ entering input port 2 of AWG 310 having a wavelength of $\lambda_2$ . . . , and optical signal $228_8$ entering input port 8 of AWG 310 having a wavelength of $\lambda_8$ would all converge onto output port j=1 of AWG 310, and thence traverse the same $\Delta t$ delay line 321-1 to AWG 316. According to the connectivity table of FIG. 4A, any such signal $228_i$ from input port i of AWG 310, after being delayed by $\Delta t$, would emerge from output port i of AWG 316 as the corresponding $238_i$.

Referring now to row 523 and FIG. 3, any of optical signal $228_1$ entering input port 1 of AWG 310 having a wavelength of $\lambda_9$, optical signal $228_2$ entering input port 2 of AWG 310 having a wavelength of $\lambda_{10}$ . . . , and optical signal $228_8$ entering input port 8 of AWG 310 having a wavelength of $\lambda_{16}$ would all converge onto output port j=9 of AWG 310. The converged signals $228_i$ thence travel to input port 1 of AWG 312 and reenter AWG 310 through one of the $8\Delta t$ delay line in array 323. According to the connectivity table of FIG. 4B, the converged signals $228_i$ from input port 1 of AWG 312, after being delayed by $8\Delta t$, would emerge from output port 1 of AWG 310. The respective $8\Delta t$-delayed versions of signals $228_i$ thence traverse the same $\Delta t$ delay line 321-1 to AWG 316, thereby gaining an additional $\Delta t$ delay. According to the connectivity table of FIG. 4A, any such signals $228_i$ originally from input port i of AWG 310, after being delayed by $9\Delta t$, would emerge from output port i of AWG 316 as the corresponding signals $238_i$.

Referring now to row 525 and FIG. 3, any of optical signal $228_1$ entering input port 1 of AWG 310 having a wavelength of $\lambda_{24}$, optical signal $228_2$ entering input port 2 of AWG 310 having a wavelength of $\lambda_1$ . . . , and optical signal $228_8$ entering input port 8 of AWG 310 having a wavelength of $\lambda_7$ would all converge onto output port j=24 of AWG 310. The converged signals $228_i$ thence travel to input port 8 of AWG 314 and reenter AWG 310 through one of the $16\Delta t$ delay line in array 326. According to the connectivity table of FIG. 4C, the converged signals $228_i$ from input port 8 of AWG 314, after being delayed by $16\Delta t$, would emerge from output port 8 of AWG 310. The respective $16\Delta t$-delayed versions of signals $228_i$ thence traverse the same $8\Delta t$ delay line 321-8 to AWG 316, thereby gaining an additional $8\Delta t$ delay. According to the connectivity table of FIG. 4A, any such signals $228_i$ originally from input port i of AWG 310, after being delayed by $24\Delta t$, would emerge from output port i of AWG 316 as the corresponding signals $238_i$.

It should be noted at this point that no wavelength (or signal) collision is possible when some or all of signals $228_i$ traverse the same delay line in time buffer 330. This is evident by the fact that the rows of table 500 (e.g., rows 521, 523 and 527) corresponding to each trio of delays (e.g., $\Delta t$, $9\Delta t$ and $17\Delta t$) afforded by sharing the same delay line (e.g., 321-1) all have different wavelengths required of signals $228_i$.

It should also be noted that the size of a time buffer is determined primarily by the cumulative length of the delay lines in the buffer. For comparison of the size of time buffer 330 with that of the equivalent time buffer 230 with N=8 and K=24, let's assume each unit length of a delay line contributes to a $\Delta t$ delay. Thus, time buffer 330 has array 321 including 8 delay lines ranging from 1 unit to 8 units in length, array 323 including 8 delay lines each of which is 8 units in length, and array 326 including 8 delay lines each of which is 16 units in length. As a result, the cumulative length of the delay lines in buffer 330 is 8×8+8×16+1+2+3+4+5+6+7+8=224 units. In contrast, the equivalent time buffer 230 includes 24 delay lines ranging from 1 unit to 24 units in length, resulting in a cumulative length of 1+2 . . . +24=300 units. Advantageously, the size of time buffer 330 is significantly smaller than that of the equivalent time buffer 230.

In accordance with another embodiment of the invention, time buffer 230 in FIG. 3 may be replaced by multi-channel optical arrayed time buffer 630, as illustrated in FIG. 6. Without loss of generality, time buffer 630 has N=8 input optical ports at which the respective optical signals $228_1$-$228_8$ enter, each of which is afforded one of K=24 different delays. Like time buffer 330, time buffer 630 may re-circulate an input optical signal in a manner to be described to extend a delay thereto through a shared delay line, thereby reducing the lengths of some of the delay lines, and thus the size, of the equivalent time buffer 230. To that end, time buffer 630 in this instance also employs a 24×24 AWG, denoted 610, and three 8×8 AWGs, denoted 612, 614 and 616, respectively. Where AWGs 612, 614 and 616 are cyclical in an embodiment, each of the AWGs may be provisioned similarly to AWG 412 of FIG. 4D and may have the same input/output port mapping depicted in FIG. 4E. Optical signals $228_1$-$228_8$ enter time buffer 630 at respective input ports 1-8 of AWG 610 and emerge from time buffer 630 at respective output ports 1-8 of AWG 616 as $238_1$-$238_8$. For ease of following, some of the port numbers are indicated in FIG. 6. Like time buffer 330, time buffer 630 is provisioned to maintain a fixed connectivity between its input ports (same as input ports 1-8 of AWG 610) and its output ports (same as output ports 1-8 of AWG 616). For the sake of convenience and without loss of generality, in this embodiment such a fixed input/output (I/O) port connectivity is implemented as depicted in FIG. 7A, whereby optical signal $228_i$ ($1 \leq i \leq 8$) entering input port i of AWG 610 always emerges from output port i of AWG 616 as signal $238_i$, regardless of the actual wavelength of signal $228_i$.

Similarly, in this embodiment a fixed (I/O) port connectivity between the AWG 612 and 610 pair is maintained as depicted in FIG. 7B, whereby an optical entering input port i ($1 \leq i \leq 8$) of AWG 612 always emerges from output port i of AWG 610, regardless of the actual wavelength of the entering optical signal. In addition, in this embodiment a fixed (I/O) port connectivity between the AWG 614 and 610 pair is maintained as depicted in FIG. 7C, whereby an optical signal entering input port i ($1 \leq i \leq 8$) of AWG 614 always emerges from output port i of AWG 610, regardless of the actual wavelength of the entering optical signal. Again, it should be noted that the above I/O port connectivity between the various AWG pairs are for illustrative purposes only. It will be appreciated that a person skilled in the art may implement other I/O port permutations to suit his/her particular needs.

Referring back to FIG. 6, in this embodiment AWG 610 has 24 input ports, which is a multiple of the number of input signals to time buffer 630, i.e., three times the number of input signals (8). The 24 output ports of AWG 610 are divided into groups of eight. The first group consists of output ports 1-8, which are connected to input ports 1-8 of AWG 616 through an array of eight delay lines (denoted 621). Unlike the delay lines in array 321 in time buffer 330, the delay lines in array 621 here afford delays in an increment of 3Δt. In this instance, these delays are Δt, 4Δt . . . and 22Δt, respectively. The second group of output ports 9-16 of AWG 610 are connected to input ports 1-8 of AWG 612, and reconnected to AWG 610 through a second array of eight delay lines, denoted 623, which uniformly afford a Δt delay, as opposed to an 8Δt delay afforded by the delay lines in array 323 of FIG. 3. The third group of output ports 17-24 of AWG 610 are connected to input ports 1-8 of AWG 614 through a third array of eight delay lines, denoted 626, which uniformly afford a 2Δt delay, as opposed to a 16Δt delay afforded by the delay lines in array 326 of FIG. 3. The output ports of AWG 614 are connected to respective input ports of AWG 610.

In this instance, each AWG in time buffer 630 is a cyclical AWG, and has a free spectral range equal to the number of input ports times the channel spacing (Δλ) of input wavelengths $\lambda_k$ (k=1 . . . 24), where $\lambda_k = \lambda_1 + k\Delta\lambda$, and $\lambda_1$ is a predetermined wavelength. Depending on the actual wavelength $\lambda_k$ of signal $228_i$, it may circulate through AWG 612 to gain an extended delay of Δt, or through AWG 614 to gain an extended delay of 2Δt, before reentering AWG 610 to be routed to one of delay lines in array 621. In fact, by adjusting TWC $220_i$ to provide a selected one of $\lambda_k$ for signal $228_i$, the above-described arrangement of time buffer 330 can impart any of Δt, 2Δt . . . up to 24Δt to signal $228_i$. FIG. 8 is a table 800 defining the relation between input signal $228_i$ of varying wavelengths $\lambda_k$ and the 24 different time delays which can be imparted to the signal by routing it to the corresponding output port j (j=1 . . . 24) of AWG 610 in time buffer 630. In general, for input optical signal $228_i$ of wavelength $\lambda_k$, time buffer 630 imparts a delay DΔt to the input signal, where D=(p−1) DIV 8+3[(k+i−2) MOD 8]+1, p=(k+i−1) MOD 24, and DIV represents the standard integer division operator, and MOD represents the standard modulo operator.

By sorting the rows of table 800 on the j index of AWG 610 output port numerically, the coupling vectors CV1 through CV8 associated with the input ports of AWG 610 can readily be read from the resulting columns of table 800, respectively. Thus, based on column 801 in table 800, it can be shown that the coupling vector associated with input port 1 (CV1) of AWG 610 in this instance is ($\lambda_1$ $\lambda_2$ . . . $\lambda_{24}$). Because of the cyclical nature of all AWGs including AWG 610 in time buffer 630 in this embodiment, other coupling vectors of AWG 610, CV2 through CV8, can easily be obtained by cyclically shifting the components of CV1 one position at a time. That is, CV2=($\lambda_{24}$ $\lambda_1$ . . . $\lambda_{23}$), CV3=($\lambda_{23}$ $\lambda_{24}$ . . . $\lambda_{22}$), and CV8=($\lambda_{18}$ $\lambda_{19}$ . . . $\lambda_{17}$) in this embodiment.

Each row of table 800 is associated with a particular one of the 24 delays, which specifies the required wavelengths of individual signals $228_i$ to be afforded the particular delay, and the output port j of AWG 610 from which a delay path emanates through which the required wavelengths travel in time buffer 630. For example, referring to row 821 and FIG. 6, any of optical signal $228_1$ entering input port 1 of AWG 610 having a wavelength of $\lambda_1$, optical signal $228_2$ entering input port 2 of AWG 610 having a wavelength of $\lambda_{24}$ . . . , and optical signal $228_8$ entering input port 8 of AWG 610 having a wavelength of $\lambda_{18}$ would all converge onto output port j=1 of AWG 610, and thence traverse the same Δt delay line 621-1 to AWG 616. According to the connectivity table of FIG. 7A, any such signal $228_i$ from input port i of AWG 610, after being delayed by Δt, would emerge from output port i of AWG 616 as the corresponding $238_i$.

Referring now to row 823 and FIG. 6, any of optical signal $228_1$ entering input port 1 of AWG 610 having a wavelength of $\lambda_{10}$, optical signal $228_2$ entering input port 2 of AWG 610 having a wavelength of $\lambda_9$ . . . , and optical signal $228_8$ entering input port 8 of AWG 610 having a wavelength of $\lambda_3$ would all converge onto output port j=10 of AWG 310. The converged signals $228_i$ thence travel to input port 2 of AWG 612 and reenter AWG 610 through one of the Δt delay line in array 623. According to the connectivity table of FIG. 7B, the converged signals $228_i$ from input port 2 of AWG 612, after being delayed by $\Delta t$, would emerge from output port 2 of AWG 610. The respective $\Delta t$-delayed versions of signals $228_i$ thence traverse the same $4\Delta t$ delay line 621-2 to AWG 616, thereby gaining an additional $4\Delta t$ delay. According to the connectivity table of FIG. 7A, any such signals $228_i$ originally from input port i of AWG 610, after being delayed by $5\Delta t$, would emerge from output port i of AWG 616 as the corresponding signals $238_i$.

Referring now to row 825 and FIG. 6, any of optical signal $228_1$ entering input port 1 of AWG 610 having a wavelength of $\lambda_{24}$, optical signal $228_2$ entering input port 2 of AWG 610 having a wavelength of $\lambda_{23}$ . . . , and optical signal $228_8$ entering input port 8 of AWG 610 having a wavelength of $\lambda_{17}$ would all converge onto output port j=24 of AWG 610. The converged signals $228_i$ thence travel to input port 8 of AWG 614 and reenter AWG 610 through one of the $2\Delta t$ delay line in array 626. According to the connectivity table of FIG. 7C, the converged signals $228_i$ from input port 8 of AWG 614, after being delayed by $2\Delta t$, would emerge from output port 8 of AWG 610. The respective $2\Delta t$-delayed versions of signals $228_i$ thence traverse the same $22\Delta t$ delay line 621-8 to AWG 616, thereby gaining an additional $22\Delta t$ delay. According to the connectivity table of FIG. 7A, any such signals $228_i$ originally from input port i of AWG 610, after being delayed by $24\Delta t$, would emerge from output port of AWG 616 as the corresponding signals $238_i$.

It should be noted at this point that no wavelength (or signal) collision is possible when some or all of signals $228_i$ traverse the same delay line in time buffer 630. This is evident by the fact that the rows of table 800 (e.g., rows 821, 827 and 829) corresponding to each trio of delays (e.g., $\Delta t$, $2\Delta t$ and $3\Delta t$) afforded by sharing the same delay line (e.g., 621-1) all have different wavelengths required of signals $228_i$.

Again, it should be noted that the size of a time buffer is determined primarily by the cumulative length of the delay lines in the buffer. Let's assume each unit length of a delay line contributes to a $\Delta t$ delay. Thus, time buffer 630 has array 621 including 8 delay lines having 1, 4, 7, 10, 13, 16, 19 and 22 units in length, respectively; array 623 including 8 delay lines each of which is 1 unit in length; and array 626 including 8 delay lines each of which is 2 units in length. As a result, the cumulative length of the delay lines in buffer 630 is $8\times1+8\times2+1+4+7+10+13+16+19+22=116$ units. Advantageously, the size of time buffer 330 is significantly smaller than that of the equivalent time buffer 230 (cumulative length of 300 units) and time buffer 330 (cumulative length of 224 units).

Based on the disclosure of various embodiments of the invention heretofore, a person skilled in the art will readily be able to further reduce the total length of delay lines in a time buffer by allowing an optical signal to re-circulate through an AWG multiple times. Moreover, a person skilled in the art will readily be able to use an appropriate combination of few AWGs to significantly increase the longest affordable delay in a time buffer without an appreciable increase in its footprint. In addition, proper use of AWGs in the time buffer allows sharing the entire arrangement among multiple optical channels without additional hardware. The full arrangement may be integrated on a planar lightwave circuit (PLC) in a compact form, on a single chip in semiconductor substrate, or on a Si-based platform. To compensate for any propagation losses which may limit the length of the longest affordable delay, in some embodiments, semiconductor optical amplifiers on a semiconductor substrate or Erbium-doped waveguide amplifiers on a silica based platform are used for monolithic or hybrid integration. Further reduction of propagation losses may be achieved by use of simple, low cost, low loss fiber ribbons as some of the delay-line arrays in the embodiments. The architecture of the time buffers, as described, is conducive to effective scalability. For example, in some embodiments, the depth of the time buffers is increased by employing AWGs with more ports and/or increasing the number of wavelengths used. In other embodiments, it is increased by increasing the number of arrays of delay lines sharing the input/output ports of the same AWG (e.g., 310, 610) in the time buffers.

Referring back to FIG. 2, each optical signal 238 is applied to a respective "fixed" wavelength converter (WC) 240, where it undergoes a wavelength conversion process that is reverse to that imposed by the preceding TWC 220. More specifically, WC 240, converts the wavelength of signal $238_1$ back into $\lambda_1$. WC $240_i$ (not explicitly shown in FIG. 2, $1 \leq i \leq N$) converts the wavelength of signal $238_i$ back into $\lambda_i$. Finally, WC $240_N$ converts the wavelength of signal $238_N$ back into $\lambda_N$. WC 240 is termed "fixed" because it essentially converts any input wavelength into a prescribed ("fixed") wavelength. In one embodiment, TWC 220 and WC 240 can be implemented using different instances of the same physical wavelength-conversion device. To implement TWC 220, an instance of that device is configured, using appropriate control signals, to convert a predetermined input wavelength into a desired (tunable) output wavelength. Similarly, to implement WC 240, an instance of that device is configured, using appropriate control signals, to convert any (tunable) input wavelength into a predetermined output wavelength.

MUX 250 multiplexes the optical signals produced by WCs $240_1$-$240_N$ into WDM signal 116. Note that the latter signal has the same wavelength and data packet composition as WDM signal 102. However, unlike the packets carried by the WDM components of WDM signal 102, the packets carried by the WDM components of WDM signal 116 are synchronized to one another.

Figure 9:
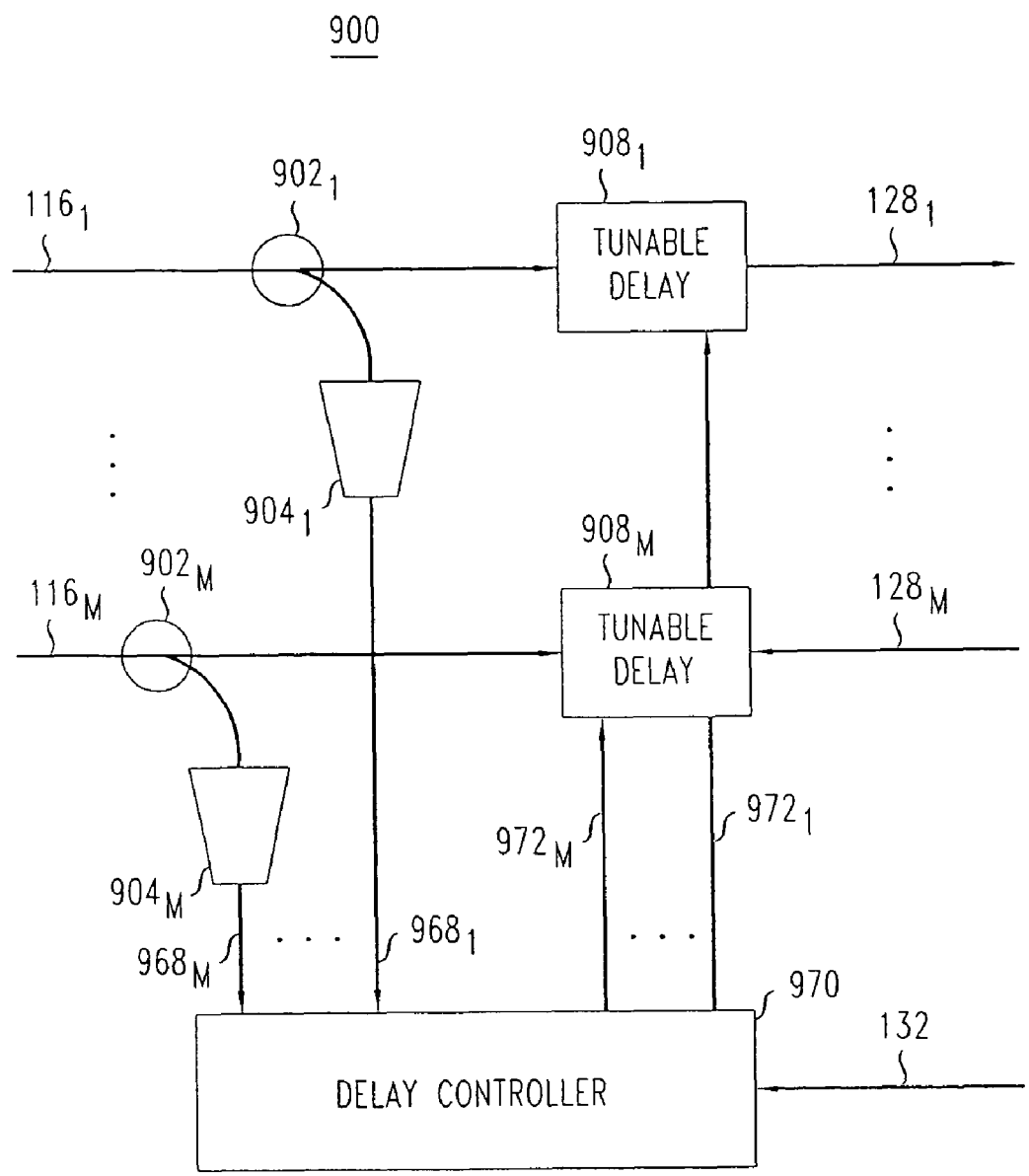
FIG. 9 is a block diagram of a multiplex synchronizer that may be used in the system of FIG. 1.

FIG. 9 shows a block diagram of a multiplex synchronizer 900 that can be used as multiplex synchronizer 120 in FIG. 1 according to one embodiment of the invention. Multiplex synchronizer 900 has an array of optical tunable delays $908_1$-$908_M$, each receiving a respective one of WDM signals $116_1$-$116_M$. Tunable delay 908 is a continuously tunable optical delay circuit controlled by a control signal 972 generated by a delay controller 970. Delay controller 970 receives reference clock signal 132 of FIG. 1 and M monitor signals $968_1$-$968_M$. Each monitor signal 968 is generated by (i) tapping the respective WDM signal 116 using an optical tap 902 and (ii) converting the output of the tap into an electrical signal using an optical-to-electrical converter (e.g., a photodiode) 904. Delay controller 970 processes monitor signals $968_1$-$968_M$ to determine temporal alignment of WDM signals $116_1$-$116_M$ with one another and with reference clock signal 132. Based on the processing results, delay controller 970 generates control signals $972_1$-$972_M$ that configure tunable delays $908_1$-$908_M$, respectively, to delay each of WDM signals $116_1$-$116_M$ by a respective appropriate amount so that the resulting delayed signals, i.e., WDM signals $128_1$-$128_M$, are synchronized to one another and to reference clock signal 132. Continuous monitoring of WDM signals $116_1$-$116_M$ via monitor signals $968_1$-$968_M$ enables delay controller 970 to appropriately adjust, if necessary, the settings of tunable delays $908_1$-$908_M$ to maintain said synchronization of WDM signals $128_1$-$128_M$. In an alternative embodiment, multiplex synchronizer 900 may tap WDM signals $128_1$-$128_M$ instead of or in addition to WDM signals $116_1$-$116_M$. The tap signals can similarly be converted into electrical signals and supplied to delay controller 970 for generating control signals $972_1$-$972_M$.

Figure 10:
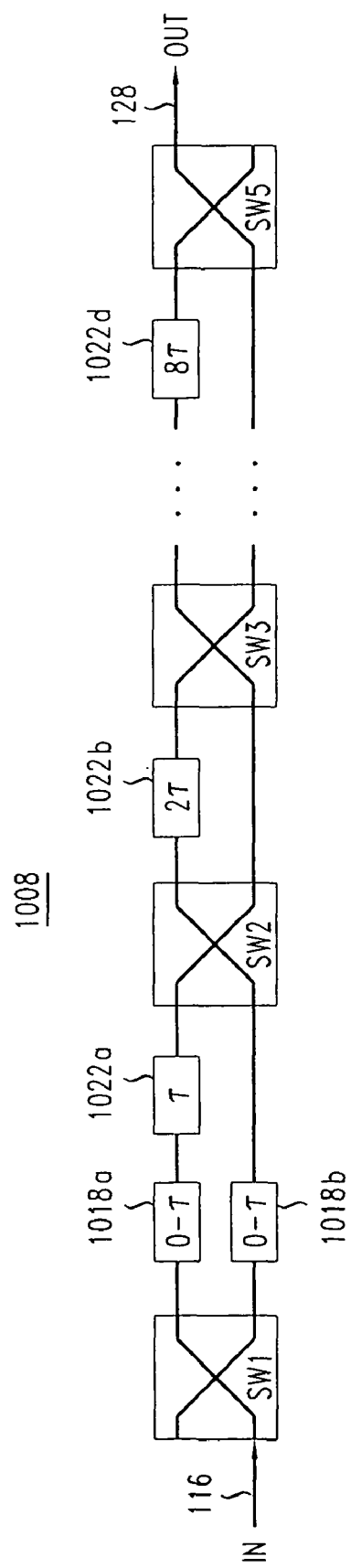
FIG. 10 is a block diagram of an optical tunable delay circuit that may be used in the multiplex synchronizer of FIG. 9 according to an illustrative embodiment of the invention.

FIG. 10 is a block diagram of an optical tunable delay circuit 1008 that can be used as each instance of optical tunable delay 908 according to one embodiment of the invention. Circuit 1008 has a plurality of optical delay elements 1018 and 1022 connected between five 2×2 switches SW1-SW5. Each of optical delay elements 1018a-b is a continuously tunable delay element that can be configured to introduce any selected signal-propagation delay between 0 and τ. Optical delay elements 1022a-d are fixed delay elements that introduce signal-propagation delays τ, 2τ, 4τ, and 8τ, respectively. In other words, optical delay elements 1022a-d form a binary set of fixed delay elements.

By engaging or disengaging various delay elements, delay circuit 1008 can access a continuous delay range between 0 and 16τ. More specifically, switch SW1 can direct the optical signal (e.g., WDM signal 116) applied to the input port of delay circuit 1008 to a delay arm having serially connected delay elements 1018a and 1022a or to a delay arm having delay element 1018b. Then, switch SW2 can direct the optical signal received from switch SW1 to a delay arm having delay element 1022b or to a delay arm that bypasses that delay element. Switch SW3 can direct the optical signal received from switch SW2 to a delay arm having delay element 1022c (not explicitly shown in FIG. 10) or to a delay arm that bypasses that delay element. Switch SW4 (not explicitly shown in FIG. 10) can direct the optical signal received from switch SW3 to a delay arm having delay element 1022d or to a delay arm that bypasses that delay element. Finally, switch SW5 directs the optical signal received from switch SW4 to the output port of delay circuit 1008, e.g., to produce WDM signal 128.

To produce a delay value between 0 and τ, switches SW1-SW5 of delay circuit 1008 are configured to direct WDM signal 116 through delay element 1018b and bypass all other delay elements. To produce a delay value between τ and 2τ, switches SW1-SW5 are configured to direct WDM signal 116 through delay elements 1018a and 1022a and bypass all other delay elements. To produce a delay value between 2τ and 3τ, switches SW1-SW5 are configured to direct WDM signal 116 through delay elements 1018b and 1022b and bypass all other delay elements, etc. A detailed description of the design and operation of optical tunable delay circuits that, similar to circuit 1008, can provide a relatively large continuously tunable delay range can be found, e.g., in commonly owned U.S. Pat. Nos. 6,956,991 and 7,212,695, both of which are incorporated herein by reference.

Figure 11A:
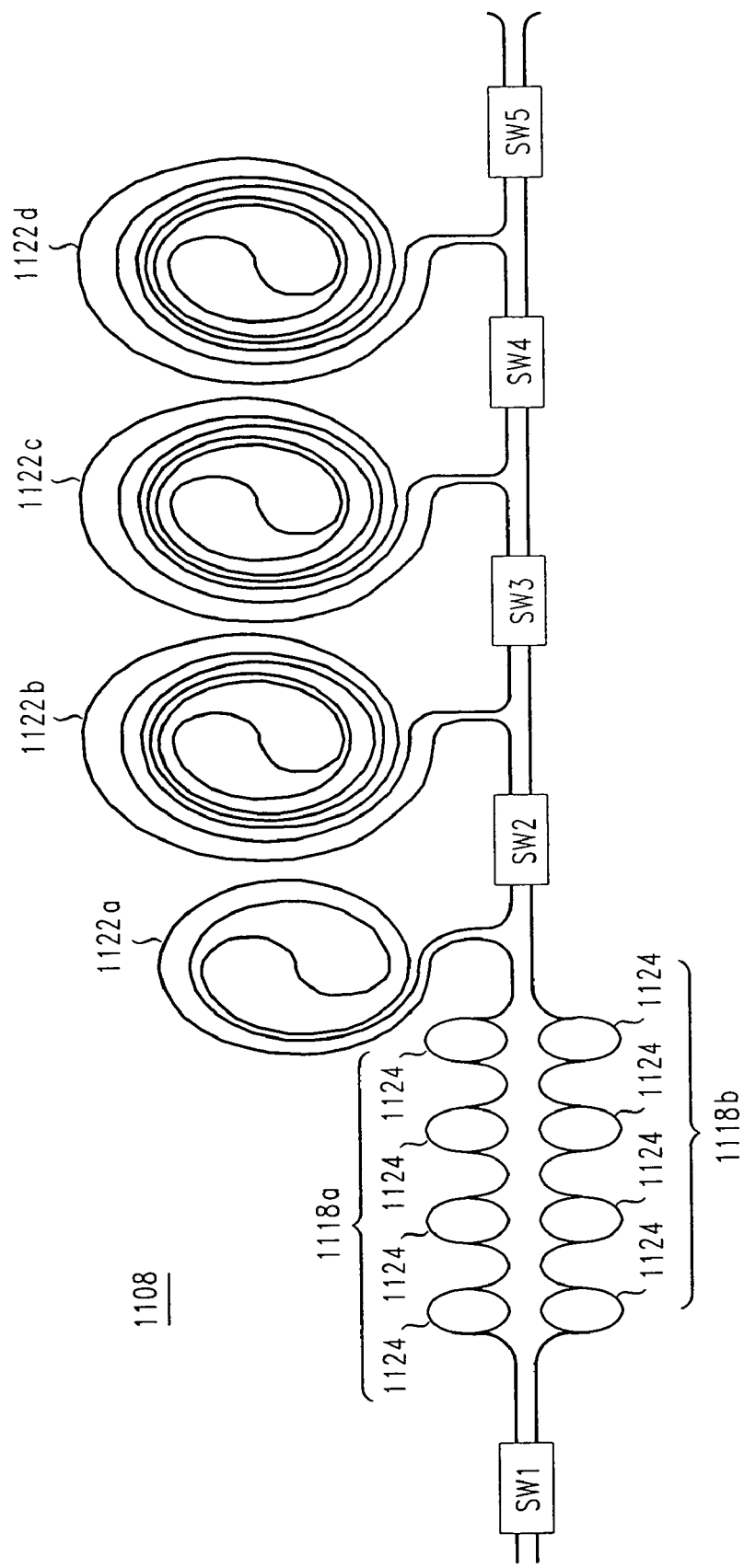
FIGS. 11A and B show top views of an optical tunable delay circuit that may be used in the multiplex synchronizer of FIG. 9 according to another illustrative embodiment of the invention.

FIGS. 11A and B show an optical tunable delay circuit 1108 that can be used as each instance of optical tunable delay 908 of FIG. 9 according to another embodiment of the invention. Circuit 1108 is generally analogous to circuit 1008, and analogous elements of the two circuits are designated with labels having the same last two or three digits/letters. However, circuit 1108 is specifically designed as an integrated waveguide circuit, whereas circuit 1008 is generic and not limited to any particular implementation technology. Circuit 1108 can be viewed as one possible implementation of circuit 1008.

Referring to FIG. 11A, each of fixed delay elements 1122a-d has a bi-spiral waveguide loop. The first spiral of the loop spirals inward until it connects with the second spiral, which then spirals outward. The length of the waveguide loop and therefore the signal-propagation delay time accrued therein is determined by the number of spiral turns. Therefore, delay element 1122a has fewer spiral turns than delay element 1122b, which has fewer spiral turns than delay element 1122c, etc. The bi-spiral layout of delay elements 1122a-d is advantageous in that it efficiently packs into a relatively small area a substantial length of waveguide, which helps to reduce the surface area occupied by circuit 1108.

Each of tunable delay elements 1118a-b is a tunable four-stage optical all-pass filter (OAPF). All-pass filters are known in the electrical and optical arts and have an advantageous property of affecting only the phase of a signal, rather than its amplitude. As explained in the above-cited U.S. Pat. No. 6,956,991, this OAPF property can be used to create a continuously tunable optical delay element that is relatively compact and does not have any mechanically movable parts. A tunable delay element based on an OAPF can contain one, two, or more OAPF stages. Various suitable single-stage and multi-stage OAPFs are disclosed, e.g., in commonly owned U.S. Pat. Nos. 6,289,151 and 7,016,615, both of which are incorporated herein by reference.

Figure 11B:
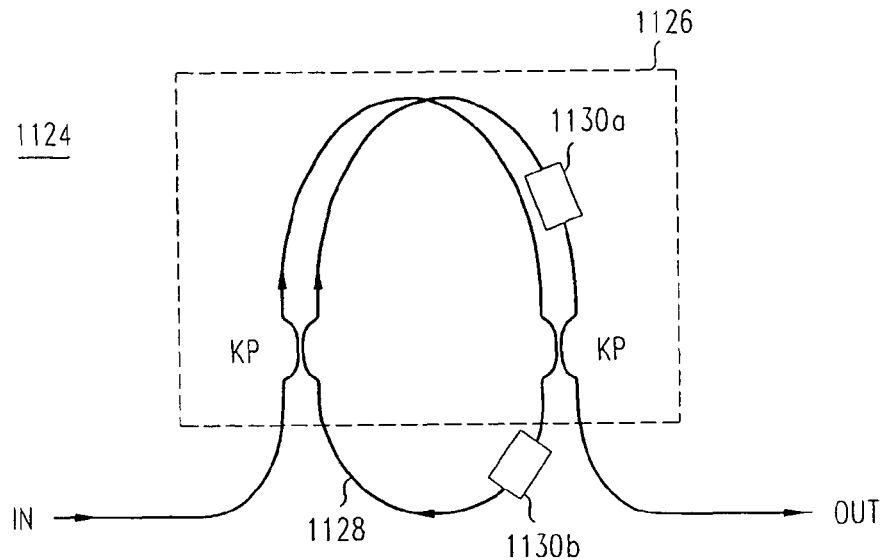

FIG. 11B shows an OAPF 1124 that is used as a stage in OAPF 1118. OAPF 1124 has a Mach-Zehnder interferometer (MZI) 1126 and a feedback path 1128. The internal arms of MZI 1126 are coupled to one another via two tunable optical couplers, each illustratively shown as having optical coupling strength κ. One of the MZI arms incorporates a tunable phase shifter 1130a, and feedback path 1128 incorporates a tunable phase shifter 1130b. In the frequency domain, the group delay generated by OAPF 1124 is represented by a periodic sequence of resonance-like peaks, with the shape and amplitude of the peaks and their periodicity (also referred to as the free spectral range (FSR) of the OAPF) determined by the lengths of the feedback loop and MZI arms, the coupling strengths, and phase shifts $\Phi_a$ and $\Phi_b$ introduced by phase shifters 1130a-b, respectively. Using appropriate control signals, e.g., applied to tunable phase shifters 1130a-b and/or the tunable optical couplers (KP), one can change the shapes of the group delay curves generated by individual OAPFs 1124 to produce a desired group delay curve for OAPF 1118. Representative examples of group delay curves generated by OAPF 1124 are disclosed, e.g., in the above-cited U.S. Pat. No. 6,289,151. Other OAPFs suitable for use as individual stages in other embodiments of OAPF 1118 are also disclosed therein.

Figure 12:
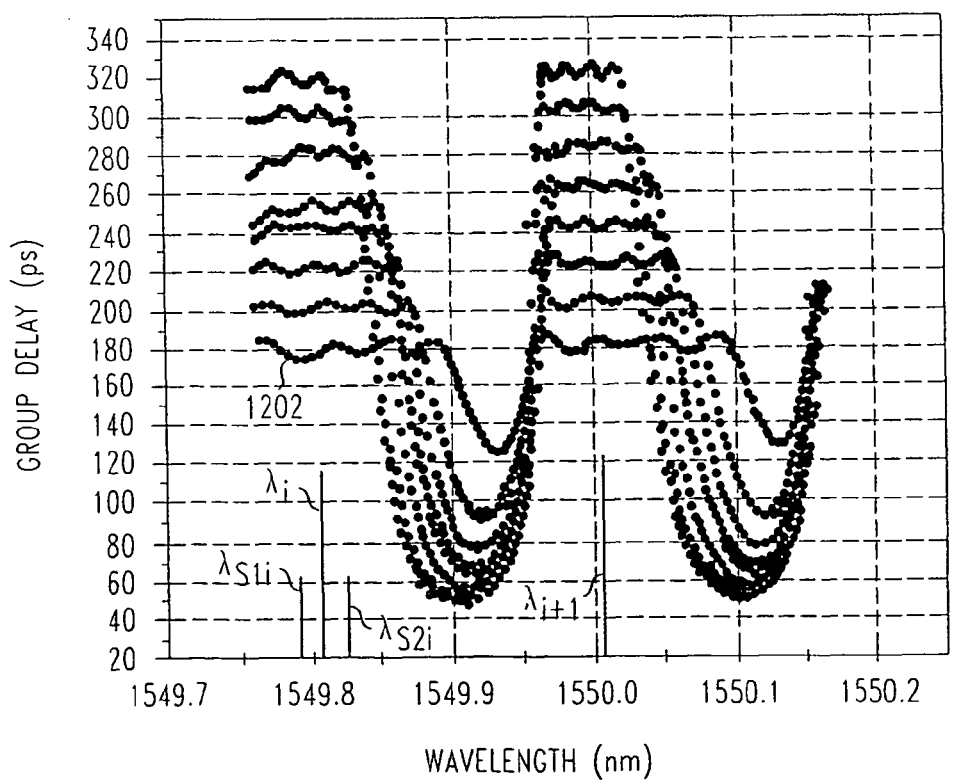
FIG. 12 is a graph illustrating a group delay generated by an optical all-pass filter used in the optical tunable delay circuit of FIGS. 11A and B.

FIG. 12 graphically illustrates the group delay generated by OAPF 1118. As already mentioned above, the group delay generated by an OAPF is periodic in the frequency domain. FIG. 12 shows two such periods for OAPF 1118. One skilled in the art will appreciate that each of the group delay curves shown in FIG. 12 has additional periods extending out in wavelength (frequency) at both sides of the shown curve.

Each of the group delay curves shown in FIG. 12 corresponds to a particular configuration of OAPF 1118. For example, a curve 1202 corresponds to a configuration, in which four OAPFs 1124 of OAPF 1118 are configured, e.g., by selecting the MZI coupling strengths and the phase shifts, to stagger their respective resonance-like peaks so that the resulting cumulative group delay curve has a periodic sequence of relatively flat portions, each having a delay value of about 180 ps. The four ripples within each "flat" portion is a manifestation of the four staggered peaks, each representing a different one of OAPFs 1124. One skilled in the art will appreciate that the amplitude of the ripples and/or the spectral width of the "flat" portion can be controlled, e.g., by changing the number of stages in OAPF 1118. Other (unlabeled) group delay curves shown in FIG. 12 are analogous to curve 1202 and are produced by tuning OAPFs 1124, primarily by changing their respective MZI coupling strengths, to change the delay value corresponding to the "flat" portions. Generally, the spectral width of a "flat" portion decreases as the delay value corresponding to the "flat" portion increases.

In one embodiment, OAPF 1118 is designed and configured so that the periodicity of its group delay curve (or its FSR) matches the spectral separation between the carrier wavelengths (frequencies) of WDM signal 116. As used herein the term "matches" means that the difference $\Delta f$ (expressed in Hz) between the spectral separation and the FSR is sufficiently small so that the cumulative frequency mismatch $N\Delta f$ across the wavelength multiplex ($\lambda_1$-$\lambda_N$) of WDM signal 116 does not exceed the spectral width of one "flat" portion. Although, in the above description, the term "flat portion" was explained in reference to a multi-stage OAPF, this term is similarly applicable to a single stage OAPF. More specifically, a spectral region near the maximum of a resonance-like group-delay peak of a single-stage OAPF, e.g., the spectral region encompassing delay values that do not deviate from the maximum delay value by more than 5%, can be considered as such "flat portion."

Furthermore, the "flat" portions of the group delay curves are spectrally aligned with the carrier wavelengths, e.g., as shown in FIG. 12. More specifically, FIG. 12 shows carrier wavelengths $\lambda_i$ and $\lambda_{i+1}$ of wavelength multiplex $\lambda_1$-$\lambda_N$. Note that the "flat" portions of the various group delay curves are aligned with carrier wavelengths $\lambda_i$ and $\lambda_{i+1}$ so that the respective modulation sidebands (see, e.g., modulation sidebands $\lambda_{s1i}$ and $\lambda_{s2i}$ of carrier wavelength $\lambda_i$) can substantially fit within the "flat" portions of the group delay curves for a desired range of delay values, e.g., those between about 180 and 320 ps. All these properties of OAPF 1118 enable optical tunable delay circuit 608 to controllably delay all WDM components of WDM signal 116 by substantially the same delay time without demultiplexing that WDM signal. Using a plurality of tunable delay circuits 1108, multiplex synchronizer 900 (FIG. 9) can advantageously be implemented as a waveguide circuit that has a relatively small size, does not have movable parts, has relatively low power consumption, and is able to efficiently maintain synchronization of a relatively large number of independent WDM signals.

The foregoing merely illustrates the principles of the invention. It will thus be appreciated that those skilled in the art will be able to devise numerous arrangements which embody the principles of the invention and are thus within its spirit and scope.

For example, although in some of the disclosed embodiments, the multi-channel optical arrayed time buffer employs cyclical AWGs for the sake of convenience, it will be appreciated that a person skilled in the art may use some or no cyclical AWGs to implement such a time buffer. In that case, some or all cyclic properties of the time buffer may disappear, e.g., the set of coupling vectors associated with the input ports of the time buffer not being readily obtainable by cyclically shifting wavelength components of one of the vectors. In addition, without the cyclic properties, the same set of wavelengths may not be used for each input of the time buffer to avoid signal collision.

In addition, in some of the disclosed embodiments, the time buffer employs, by way of example, but not limitation, AWGs having an equal number of input and output ports. It will be appreciated that a person skilled in the art to implement the time buffer may use AWGs having an unequal number of input and output ports, instead.

Finally, although communication system 100 and it various components, as disclosed, are embodied in the form of various discrete functional blocks, such a system and components could equally well be embodied in an arrangement in which the functions of any one or more of those blocks or indeed, all of the functions thereof, are realized, for example, by one or more appropriately programmed processors or devices.

What is claimed is:

1. An apparatus for processing an optical signal, Comprising:
    a plurality of delay paths comprising delay elements for affording, delays to optical signals traversing therethrough, respectively; and
    a passive optical device for passively routing a plurality of optical signals input thereto to a first one of the delay paths simultaneously through an output thereof based at least on different wavelengths of the plurality of optical signals, the plurality of optical signals being returnable to the passive optical device through the first delay path to be rerouted by the passive optical device to a second one of the delay paths, wherein a total delay affordable to the plurality of optical signals is a function of at least a first delay afforded by a delay element in the first delay path, and a second delay afforded by a delay element in the second delay path, and
    wherein the respective wavelengths of the plurality of optical signals from the output of the passive optical device are unchanged when the plurality of optical signals travel from the first delay path to the second delay path.

2. The apparatus of claim 1 wherein at least one of the delay elements includes an optical fiber of a selected length.

3. The apparatus of claim 1 wherein the passive optical device comprises an arrayed guide grating (AWG).

4. The apparatus of claim 3 wherein the AWG has a cyclical property.

5. The apparatus of claim 1 wherein delay elements in a subset of the delay paths afford different delays in accordance with a mathematical progression.

6. The apparatus of claim 5 wherein delay elements in a second subset of the delay paths afford the same delay.

7. An apparatus for processing optical signals, comprising:
    a passive optical device having a plurality of input ports and a plurality of output ports, the input ports being divided into at least first and second groups of input ports, the first group of input ports being configured to receive the optical signals; and
    a plurality of delay paths associated with corresponding ones of the output ports of the passive optical device, each delay path comprising at least one delay element for imparting a delay to an optical signal traversing the delay path, at least one of the optical signals being passively and simultaneously routable by the passive optical device to a selected one of the output ports based at least on different wavelengths of the plurality of optical signals, the plurality of optical signals being returnable to the passive optical device at a selected one of the input ports in the second group through a delay path associated with the selected output port, the selected input port being identifiable based at least on the different wavelengths of the plurality of optical signals,
    wherein the respective wavelengths of the plurality of optical signals are unchangeable when the plurality of optical signals travel from the selected output port to the selected input port.

8. The apparatus of claim 7 wherein the plurality of input ports and the plurality of output ports are identical in quantity.

9. The apparatus of claim 7 wherein the number of input ports in the second group is a multiple of the number of input port in the first group.

10. The apparatus of claim 7 wherein the passive optical device comprises an AWG.

11. The apparatus of claim 10 wherein the AWG has a cyclical property.

12. The apparatus of claim 7 wherein delay elements of a subset of the delay paths afford different delays which follow a mathematical progression.

13. The apparatus of claim 12 wherein delay elements of a second subset of the delay paths afford the same delay.

14. A method for use in an apparatus for processing an optical signal, the apparatus including a passive optical device, the method comprising:

using the passive optical device to passively route a plurality of optical signals input thereto simultaneously through an output thereof to a first delay path based at least on different wavelengths of the plurality of optical signals, the first delay path comprising a delay element for imparting a first delay to the plurality of optical signals traversing therethrough; and returning the plurality of optical signals to the passive optical device through the first delay path to be re-routed by the passive optical device to a second delay path, the second delay path comprising another delay element for imparting a second delay to the plurality of optical signals, wherein a total delay imparted to the plurality of optical signals is a function of at least the first delay and the second delay, and wherein the respective wavelengths of the plurality of optical signals from the output of the passive optical device are unchanged when the plurality of optical signals travel from the first delay path to the second delay path.

15. The method of claim 14 wherein the at least one optical signal was converted horn a given signal, the given signal being convertible to a second optical signal to be routed by the passive optical device to the second delay path.

16. A signal processing system, comprising: a signal converter for converting signal inputs thereto to at least first and second optical signals, the first optical signal having a first wavelength, and the second optical signal having a second wavelength; and a passive optical device for passively routing the first and second optical signals simultaneously through an output of the passive optical device, to a first delay path for imparting as first delay to the first and second optical signals traversing therethrough, and for routing the first and second optical signals to a second delay path for imparting a second delay to the first and second optical signals traversing therethrough, the first and second optical signals being returnable to the passive optical device through the first delay path to be rerouted by the passive optical device to the second delay path, and wherein the respective wavelengths of the first and second optical signals from the output of the passive optical device are unchanged when the first and second optical signals travel from the first delay oath to the second delay path.

17. The system of claim 16 wherein the first delay path includes an optical fiber of a selected. length.

18. The system of claim 17 wherein the second delay path includes an optical fiber whose length is different than the selected length.

19. The system of claim 16 wherein the signal converter comprises a tunable wavelength converter.

20. The system of claim 16 wherein the passive optical device comprises an AWG.

21. The system of claim 20 wherein the AWG has a cyclical property.

* * * * *